B. C. SEATON.
LEAF SPRING.
APPLICATION FILED NOV. 19, 1917.
1,314,021.
Patented Aug. 26, 1919.
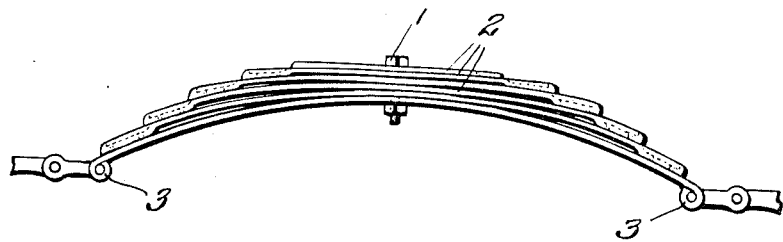
Fig. 1
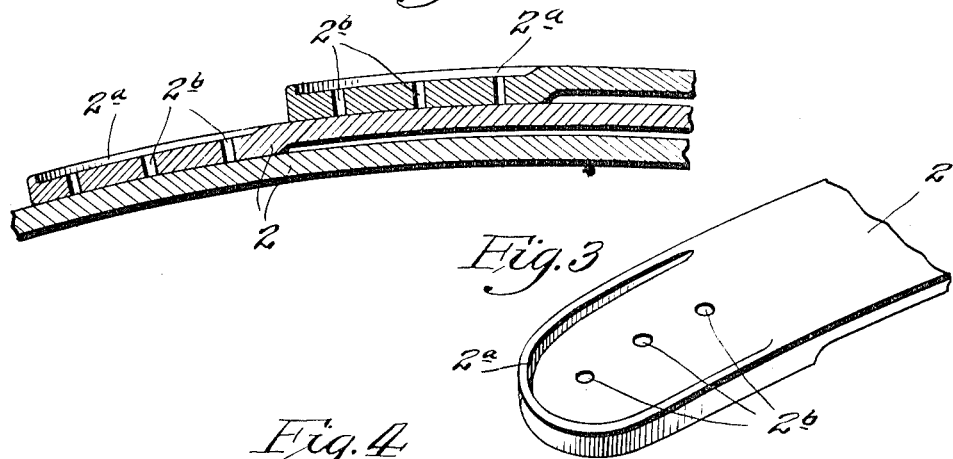
Fig. 2
Fig. 3
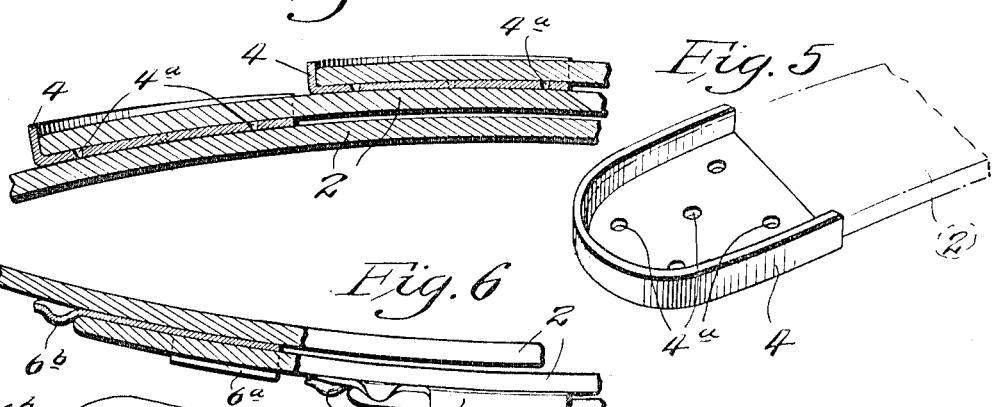
Fig. 4
Fig. 5
Fig. 6
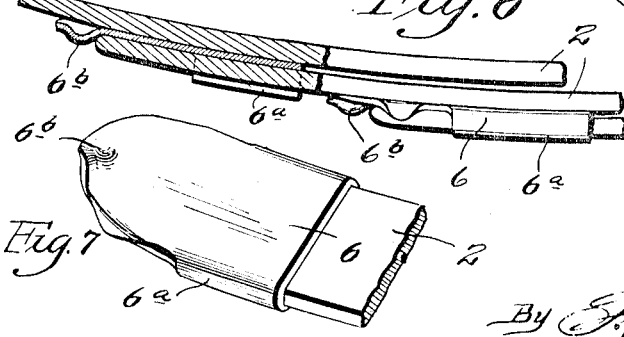
Fig. 7
Inventor
Benjamin C. Seaton,
By

UNITED STATES PATENT OFFICE.

BENJAMIN C. SEATON, OF NASHVILLE, TENNESSEE.

LEAF-SPRING.

1,314,021.  Specification of Letters Patent.  Patented Aug. 26, 1919.

Application filed November 19, 1917. Serial No. 202,773.

*To all whom it may concern:*

Be it known that I, BENJAMIN C. SEATON, a citizen of the United States, residing at Nashville, Tennessee, have invented a certain new and useful Improvement in Leaf-Springs, of which the following is a full, clear, and exact description, such as will enable others skilled in the art to which it appertains to make and use the same, reference being had to the accompanying drawings, forming part of this specification, in which,—

Figure 1 is a side elevational view of my improved spring.

Fig. 2 is a sectional view through the ends of the leaves of the spring.

Fig. 3 is a detail view of the end of one of the leaves.

Fig. 4 is a sectional view of a modified form.

Fig. 5 is a detail view of the modification shown in Fig. 4.

Fig. 6 is a detail view of another modification partly in section.

Fig. 7 is a detail view of a modified form shown in Fig. 6.

This invention relates to a new and useful improvement in leaf springs designed especially for automobiles, but which are capable of use for other purposes, such as car trucks, etc.

The object of my present invention is to make a spring composed of a series of leaves brought close together at their medial portions, their ends being enlarged or thickened so as to space the leaves apart, thereby causing the energy of each leaf to be exerted principally at its ends. These thickened portions are recessed on their upper faces or provided with openings for the purpose of lubrication. The increased thickness at the ends of the leaves may be produced by making the enlarged portion integral with the leaf, or by the addition of a spacing member, in this manner providing broad bearing surfaces of considerable area for contact with the next adjacent longer leaf.

While I have shown my improved spring as being in the form of a semi-elliptic spring, it is obvious that it is capable of use either inverted from a position shown in the drawings, or as a complete elliptic spring.

In the drawings, 1 indicates a clamping member which is designed to secure the leaves of the spring together at the center. 2 are the leaves of the spring, the lowermost of which is formed with eyes 3 at its ends capable of attachment to supporting members. The intermediate leaves of the spring at their ends are upset, or bent, as shown in Fig. 2, the outer faces of which leaves are provided with recesses 2$^a$ and perforations 2$^b$, whereby a lubricating mixture may be applied so as to reach the contacting surfaces. Instead of enlarging or bending the ends of the leaves, a sheet metal cap 4 may be employed, as shown in Fig. 4. This cap receives the end of the leaf and is provided with openings 4$^a$ so that a lubricant applied to the end of the leaf may gradually work through these openings to lubricate the contacting surfaces.

In Fig. 6, I have shown another form of cap 6, in which the edges are bent over the ends of the leaves as at 6$^a$, the end of the cap as at 6$^b$ being formed with a depression to hold the cap in position and distribute the oil. In all forms of my invention, the ends of the intermediate leaves or the caps carried thereby, contact with the adjacent leaves, thus leaving a space between the leaves from their contacting ends to the center of the spring, or the point where the leaves are secured together.

It will be readily understood that minor changes in the size, form and construction of the various parts of my improved spring may be made and substituted for those herein shown and described, without departing from the spirit of my invention, the scope of which is set forth in the appended claims.

I claim:

1. A spring composed of a plurality of leaves secured together at one point, the extremities of the intermediate leaves having metallic contacting projections forming broad bearing surfaces for engagement with the next adjacent longer leaf, whereby said intermediate leaves are spaced apart between their points of end contact and the point where said leaves are secured together.

2. A spring composed of a plurality of leaves secured together at one point, the extremities of the intermediate leaves having metallic contacting projections for engagement with the next adjacent longer leaf, whereby said intermediate leaves are spaced apart between their points of end contact and the point where said leaves are secured together, said end contacting surfaces being provided with recesses or passages for lubricating purposes.

In testimony whereof I hereunto affix my signature in the presence of two witnesses, this seventeenth day of November, 1917.

BENJAMIN C. SEATON.

Witnesses:
 M. P. SMITH,
 LAURA MEYER.